United States Patent [19]

Schiel et al.

[11] Patent Number: 5,221,147
[45] Date of Patent: Jun. 22, 1993

[54] BEARING CASE FOR A MULTIPLE-ROW ANTIFRICTION BEARING

[75] Inventors: Christian Schiel; Thomas Züfle, both of Heidenheim, Fed. Rep. of Germany

[73] Assignee: J.M. Voith GmbH, Fed. Rep. of Germany

[21] Appl. No.: 855,072

[22] Filed: Mar. 23, 1992

[30] Foreign Application Priority Data

Mar. 30, 1991 [DE] Fed. Rep. of Germany ... 9103935[U]

[51] Int. Cl.[5] ............................................. F16C 33/78
[52] U.S. Cl. .................. 384/487; 384/488; 384/571
[58] Field of Search ............ 384/487, 488, 571, 480, 384/478, 477, 153, 144, 571

[56] References Cited

U.S. PATENT DOCUMENTS

| | | | |
|---|---|---|---|
| 4,093,324 | 6/1978 | Carrigan | 384/480 |
| 4,909,707 | 3/1990 | Wauligman et al. | 384/488 |
| 4,978,236 | 12/1990 | Östling | 384/480 |

FOREIGN PATENT DOCUMENTS 7016135 4/1970 Fed. Rep. of Germany .

OTHER PUBLICATIONS

SKF Main Catalog (1988), pp. 94, 95, 239-241.

Primary Examiner—Lenard A. Footland
Attorney, Agent, or Firm—Baker & Daniels

[57] ABSTRACT

A bearing case for a multiple-row self-aligning antifriction bearing, preferably a self-aligning roller bearing, supports a roll journal and has a circulating oil lubrication system with oil feed line and outlet channel. The discharge point of the feed line is located on the one side of the antifriction bearing while the entrance to the outlet channel is arranged on the other side of the antifriction bearing. Provided between the discharge point of the feed line and the adjacent end wall of the bearing case is a baffle that interacts with a stop ring surrounding the roll journal as a sealing element. The stop ring is movable in radial direction relative to the baffle.

17 Claims, 2 Drawing Sheets

BEARING CASE FOR A MULTIPLE-ROW ANTIFRICTION BEARING

BACKGROUND OF THE INVENTION

The invention concerns a bearing case for a multiple-row, self-adjusting antifriction bearing (self-aligning bearing), preferably for a double-row self-aligning roller bearing for supporting a rotatable shaft, roll journal or the like. The starting point of the invention is a bearing case with circulating oil lubrication. At least one of the end walls of the bearing case has a shaft conduit that allows a radial play between the shaft and the end wall. The circulating oil lubrication device is comprised of a feed line emptying into the interior space of the bearing case while arranged on one side of the antifriction bearing, and an outlet channel arranged in the lower area of the bearing case, the inlet of which channel is arranged on the other side of the antifriction bearing. Such a bearing case is known from DE-GM 70 16 135. Additional reference is made to the SKF main catalog 1988, particularly pages 94, 95, 239 through 241.

An antifriction bearing of that type is suited for relatively high bearing forces and relatively high speeds of rotation. The lubricating oil is fed to the antifriction bearing in cooled condition, whereby part of the friction heat generated operationally can be removed with the lubricating oil. Fashioned as a self-aligning bearing, the antifriction bearing allows an inclination of the shaft axis or roll journal axis relative to the axis of the bearing case (for instance due to flexure of the shaft or roll to which the journal belongs).

To further boost the allowable bearing strength and allowable speed of rotation, it is known from the cited catalog to feed the lubricating oil in the case of double-row antifriction bearings between the two bearing loops. In the outer race of the antifriction bearing, a circumferential channel is mostly provided which through several radial bores connects with the interior of the antifriction bearing. Each of the two rolling element loops is thus flooded with lubricating oil in the direction from inside out. From DE-GM 70 16 135 it is known to let the lubricating oil flow successively through both antifriction bearing loops, by arrangement of an oil feed line on one side of the antifriction bearing and arrangement of an oil removal device on the other side of the antifriction bearing.

While the measures described above have proved themselves in practice, there are applicational cases though where still higher speeds of rotation and/or still higher bearing strengths are called for. The problem underlying the invention is to further develop the prior bearing cases in that sense.

SUMMARY OF THE INVENTION

This problem is solved through the features of the present invention. The bearing case has between the discharge point of the feed line and the adjacent end wall an essentially axially normal partitioning wall whose shaft conduit allows a radial play between the shaft and the partitioning wall. A stop ring is installed on the partitioning wall in radially movable fashion, which surrounds the shaft at slight play and which bears in essentially liquid-tight fashion on both the partitioning wall and the shaft.

The invention is based on the insight that in the case of the prior bearings, specifically with large double-row self-aligning bearings, considerable temperature differences occur in axial direction, i.e., across the length of the rolling body. Due to the thermal deformation of the outer race and/or the rolling elements of the antifriction bearings associated with it, it is not possible to achieve a perfect contact pattern across the length of the rolling elements.

Moreover, it has been recognized that this difficulty can be eliminated, at least very extensively, by using lubricating oil in an amount still greater and specifically with a still higher viscosity than used heretofore.

For that purpose, the invention calls for providing within the bearing case a partition between the discharge point of the oil feed line and the adjacent (to this discharge point) case end wall. This partition extends essentially parallel to the adjacent end wall; it is thus, the same as the latter, essentially of an axially normal arrangement. The partitioning wall also has a shaft conduit, and this conduit also allows a radial play between the shaft (or roll journal) and the partitioning wall.

The invention also calls for providing on the partitioning wall a stop ring which both with the partitioning wall and the shaft is in essentially liquid-tight contact. The stop ring surrounds the shaft at only slight play and is radially movable along the partitioning wall. This guarantees that the shaft or roll journal still may tilt by a certain amount relative to the bearing case. The partitioning wall now defines—within the antifriction bearing case—on the one side of the antifriction bearing an oil supply chamber into which empties the oil feed line and in which the lubricating oil with relatively high viscosity can be backed up far above the (normally horizontally arranged) axis of the bearing case. The partitioning wall and the stop ring (movable radially to the partitioning wall) ensure that the packing arranged in the usual manner in the end wall of the bearing case will not be subjected to load by the pressure of the backed-up lubricating oil. A leakage of lubricating oil through the shaft conduit in the end wall is thus safely avoided, also when the shaft axis is inclined relative to the axis of the bearing case and the lubricating oil is at the same time backed up relatively high in the oil supply chamber. The prerequisites for the inventional use of oils of a relatively high viscosity and for using a maximum rate of oil throughput are thus met.

The invention additionally avoids dividing the lubricating oil, as known, in two flows of which each flows through only a single rolling element loop. Instead, as known as well, the entire amount of lubricating oil flows successively through all of the rolling element loops. Accomplished in this way is not only a relatively high cooling capacity and reduction of said temperature differences, but at the same time inevitable residual temperature difference is distributed in axial direction among several rolling elements. As a result, the invention achieves a much more precise intimate contact between the rolling elements and the races than with prior arrangements.

BRIEF DESCRIPTION OF THE DRAWINGS

The invention will be further explained with the aid of the drawings.

DESCRIPTION OF THE PREFERRED EMBODIMENT

Figure 1:
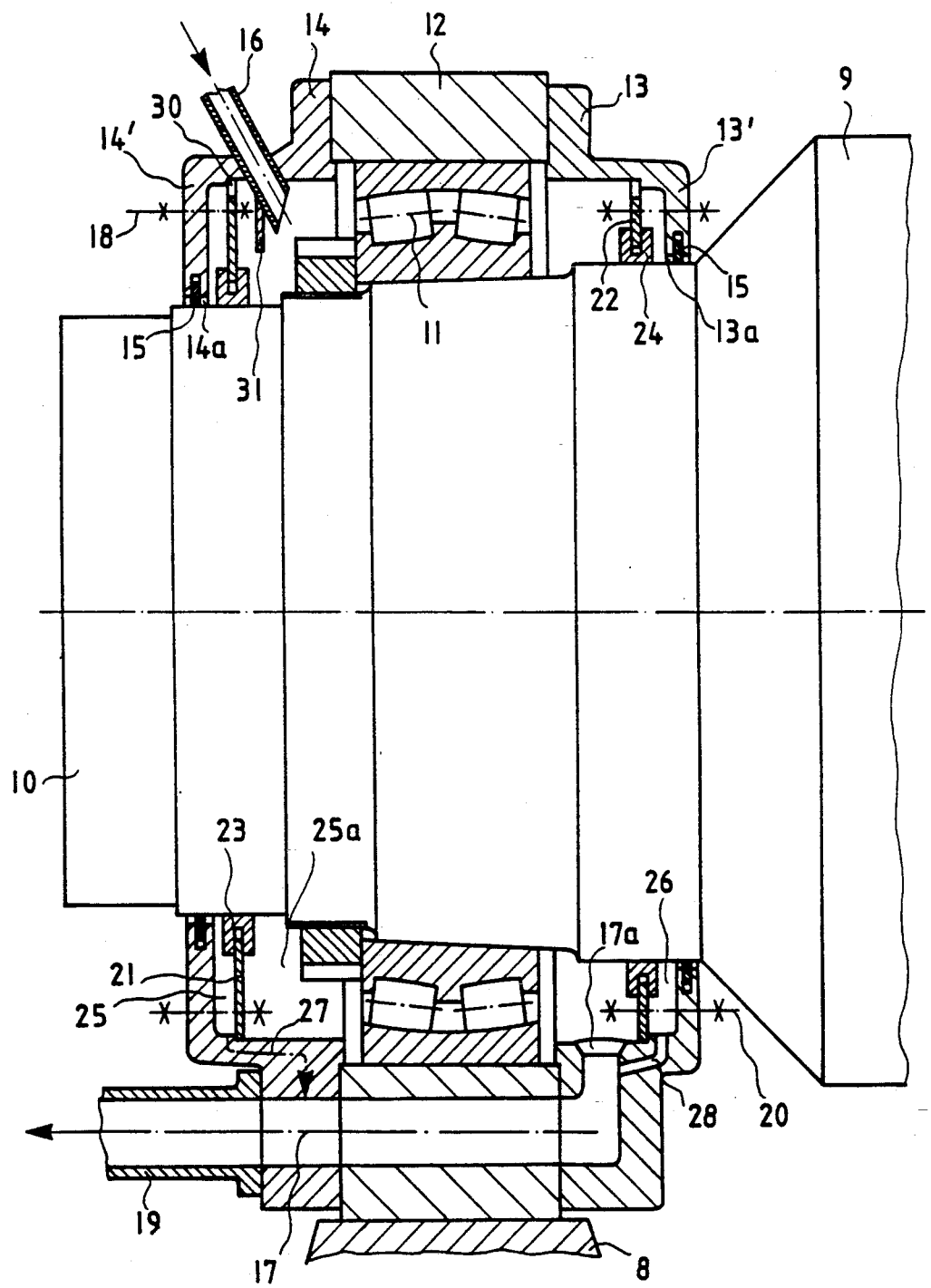
FIG. 1 shows in longitudinal section a complete bearing for a roll journal.

In FIG. 1, a roll journal 10 of a roll 9 rests in a double-row self-aligning roller bearing 11, while the latter rests in a case center part 12 which is fastened in the usual manner to a machine frame, a foundation plate 8 or similar. The bearing case comprises additionally, as usual, an inner and an outer bearing cover 13, 14, each of which features an end wall 13', 14' situated in an axially normal plane. Each of the end walls 13', 14' has for the roll journal 10 a relatively large conduit 13a, 14a, with a ring seal 15 which is radially flexible, so that a tilting of the roll journal 10 relative to the bearing case 12 through 14 can take place. The diameter of the conduit 14a of the outer bearing case 14 (in the most usual way) is smaller than that of the other conduit 13a.

A feed line 16 and an outlet channel 17 are provided for a circulating oil lubrication. The feed line 16 empties in the upper area of the bearing interior, sideways beside the self-aligning roller bearing 11, on the side of the outer end of the roll journal 10. In other words: the discharge point of the feed line 16 is situated between the end wall 14' of the outer bearing cover 14 and the adjacent antifriction bearing row (instead of "antifriction bearing row," the term antifriction bearing loop is customary as well).

The outlet channel 17 starts at a lower point of the bearing case 12 through 14, for example in the form of an oil collection pocket 17a, and is so arranged that the oil can drain by gravity after passing the self-aligning roller bearing 11. In the illustrated example, the outlet channel 17 extends successively through the inner bearing cover 13, housing center part 12, bearing cover 14 and through a drain line 19. However, the drain line 19 could be connected also to the inner bearing cover 13. It is only essential that the feed line 16 be arranged on the one side and the inlet (for example oil collection pocket 17a) to the outlet channel 17 on the other side of the self-aligning roller bearing 11.

To enable a maximally large oil amount per unit of time, and oil with a high viscosity, to flow through the bearing, the oil is backed up to a certain level on the approach side. To nevertheless preclude any risk of outward oil leakage through the conduit 14a (despite the packing 15 provided there), a partitioning wall in the form of a baffle 21 is inserted in the outer bearing cover 14 at a certain spacing from the end wall 14'. The baffle 21 is situated essentially parallel to the end wall 14', hence, the same as the latter, (at least approximately) in an axially normal plane. The baffle 21 is a component separate from the bearing cover 14. Instead, a partitioning wall cast into the bearing cover could be provided as well. In other words: it would be conceivable to make the end wall 14' double-walled. The baffle 21 bears with the major part of its circumference in liquid-tight fashion on the inside surface of the bearing cover 14. Only at the highest point (apex) there is a pressure equalization opening 30 provided. The baffle 21 subdivides the interior space enclosed by the bearing cover 14 (with end wall 14') into an oil supply chamber 25a (into which empties the feed line 16) and a leakage oil chamber 25.

The shaft conduit of the baffle 21 again is sufficiently large to allow a radial play between roll journal 10 and baffle 21. Provided as sealing element between the roll journal 10 and baffle 21 is a cross-sectionally U-shaped stop ring 23. Its two shanks extend in centrifugal direction on both sides of the baffle 21. A large radial play exists between baffle 21 and stop ring 23 for a possible inclination of the roll journal; the stop ring is thus movable in radial direction relative to the baffle. If the stop ring 23 is made of a relatively hard material, for example plastic, the baffle 21 needs to be fashioned in two parts. On the other hand, if the stop ring is made of a soft material, the baffle may be a single piece. It is essential that the radial gaps between baffle 21 and stop ring 23, for one, and the axial gap between stop ring 23 and roll journal 10, for another, are essentially liquid-tight. They need to be dimensioned in such a way that sliding friction losses will remain maximally low and that, nonetheless, minimal leakage oil will cross over into the leakage oil chamber 25.

If necessary, the pressure equalization opening 30 may also serve to allow an oil amount supplied at excess, which cannot flow crosswise through the self-aligning bearing 11, to overflow into the leakage oil chamber 25. To prevent oil churning in the interior space in the normal operation from proceeding through the pressure equalization opening 30 into the leakage oil chamber 25, a splash wall 31 is provided.

On the opposite side of the self-aligning roller bearing 11, if required, a baffle 22 and pertaining stop ring 24 may be provided as well. These again define with the end wall 13' a leakage oil chamber 26. Both leakage oil chambers 25 and 26 connect each via a leakage oil line 27 and 28, respectively, with the outlet channel 17. Fasteners, for example screws, with which the baffles 21, 22 are connected with the end walls 13' or 14' are indicated schematically at 18, 20.

Figure 2:
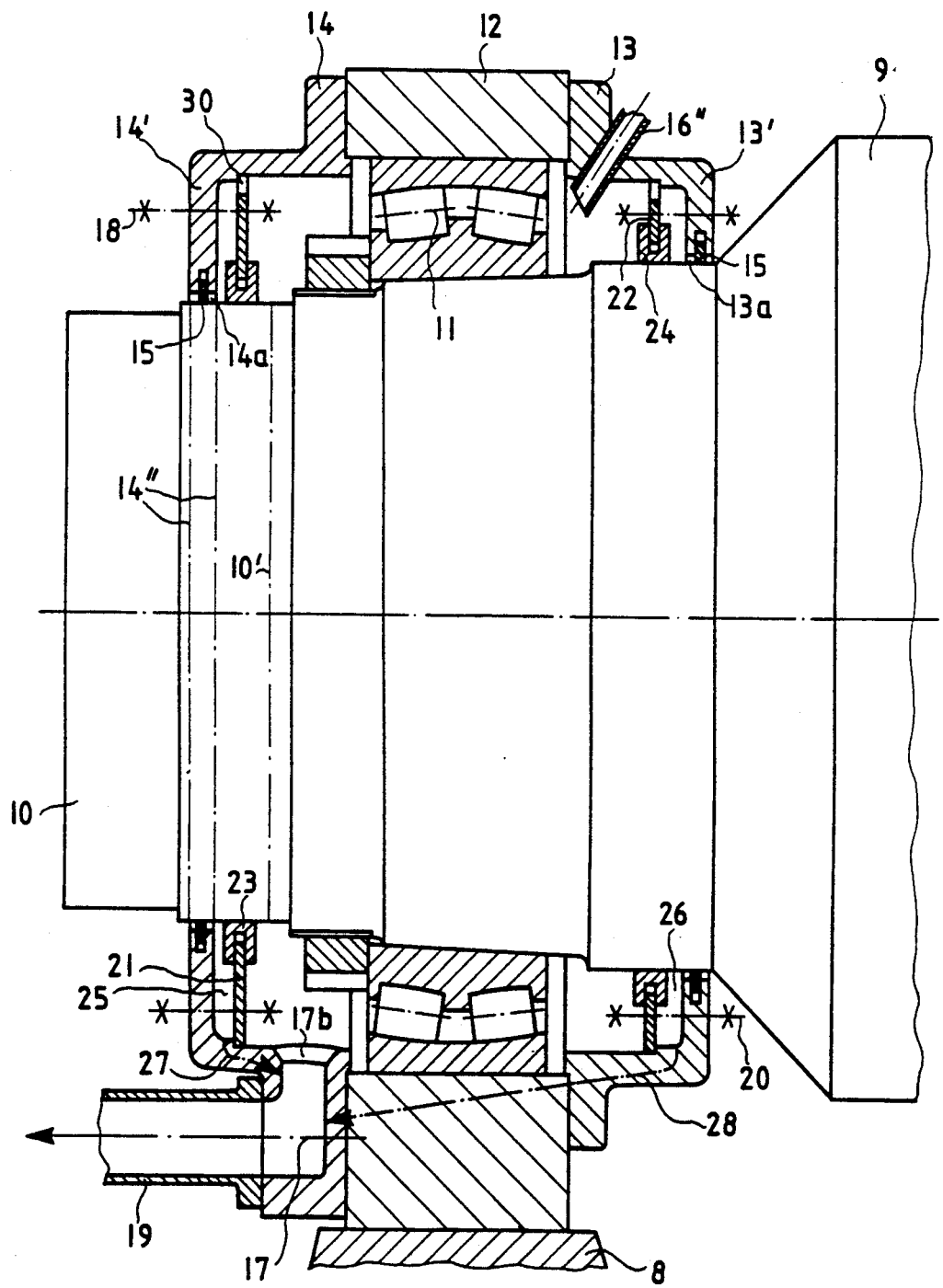
FIG. 2 shows an alternative embodiment of the bearing of FIG. 1.

In FIG. 2, all of the components remaining unchanged from FIG. 1 are referenced identically. Varying from FIG. 1, the oil feed line 16' is now arranged in the inner bearing cover 13. Consequently, the inlet 17b of the outlet channel 17 is contained in the outer bearing cover 14, making the outlet channel shorter.

Indicated by dash-dot lines 10' and 14'', in FIG. 2, is an embodiment modified once more. In this case, the roll journal ends at 10', for which reason the conduit 14a is missing in the outer bearing cover 14. Nonexistent in the area of the outer bearing cover 14 are the baffle 21, stop ring 23 and leakage oil line 27.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A bearing case for a multiple-row self-aligning antifriction bearing for supporting a rotatable shaft or a roll journal, the bearing case being of the type having at least two end walls wherein at least one of the end walls has a conduit that allows a radial play between the shaft or journal and the end wall, and wherein the bearing case further includes a circulating oil lubrication device comprising a feed line emptying via a discharge point into the interior space of the bearing case while arranged on one side of the antifriction bearing, and an outlet channel arranged in the lower area of the bearing case, the inlet portion of said outlet channel being arranged on the other side of the antifriction bearing, the improvement comprising:

the bearing case having between the discharge point of the feed line and the adjacent end wall a generally axially normal partitioning wall having a conduit, said conduit allowing a radial play between shaft or journal and said partitioning wall; and the partitioning wall having installed thereon in radially movable fashion a stop ring which surrounds the shaft or journal at slight play, and which bears in essentially liquid-tight fashion on both the partitioning wall and the shaft or journal.

2. The bearing case of claim 1, wherein the bearing case includes a partitioning wall between the inlet portion of the outlet channel and the adjacent end wall, said partitioning wall including a stop ring.

3. The bearing case of claim 2, wherein the partitioning wall is of two-part design.

4. The bearing case of claim 2, wherein the partitioning walls comprise baffles, said baffles being rigidly fastened to the bearing case.

5. The bearing case of claim 2, wherein each stop ring has a U-shaped cross section having two shanks extending on opposite sides of the partitioning wall in centrifugal direction.

6. The bearing case of claim 2, wherein each said stop ring bears on the respective partitioning wall at only slight axial play.

7. The bearing case of claim 1, wherein a leakage oil chamber is defined between the end wall adjacent to the discharge point and the partitioning wall, said chamber communicating via leakage oil channel with said outlet channel.

8. The bearing case of claim 1, wherein the stop ring has a U-shaped cross section having two shanks extending on opposite sides of the partitioning wall in centrifugal direction.

9. The bearing case of claim 1, wherein the partitioning wall comprises a baffle, said baffle being rigidly fastened to the bearing case.

10. The bearing case of claim 1, wherein said stop ring bears on the partitioning wall at only slight axial play.

11. The bearing case of claim 1, wherein the partitioning wall includes a pressure equalization opening at its maximal radially outward extending point.

12. The bearing case of claim 11, including a splash wall positioned between the partitioning wall and the antifriction bearing, which splash wall overlaps the pressure equalization opening.

13. The bearing case of claim 1, wherein both the feed line and an outer drain line of the outlet channel are arranged on the axially outermost side of the shaft or roll journal.

14. The bearing case of claim 1, wherein the feed line is arranged on the side of the antifriction bearing facing a roll body supported by the shaft or roll journal, while the inlet portion of the outlet channel is arranged on the opposite side of said antifriction bearing.

15. The bearing case of claim 14, wherein a conduit is provided only on the side of the antifriction bearing facing the roll body.

16. The bearing case of claim 1, wherein said self-aligning antifriction bearing is a double-row bearing having two antifriction bearing loops.

17. The bearing case of claim 1, wherein a conduit is provided only on the side of the antifriction bearing facing the roll body.

* * * * *